US008803970B2

(12) United States Patent
Weisensale et al.

(10) Patent No.: US 8,803,970 B2
(45) Date of Patent: Aug. 12, 2014

(54) COMBINED REAL-TIME DATA AND LIVE VIDEO SYSTEM

(75) Inventors: Rick Weisensale, Richmond, VA (US); Lenard Perkins, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 457 days.

(21) Appl. No.: 12/651,377

(22) Filed: Dec. 31, 2009

(65) Prior Publication Data

US 2011/0157357 A1 Jun. 30, 2011

(51) Int. Cl.
*H04N 7/18* (2006.01)

(52) U.S. Cl.
USPC .......................................................... 348/143

(58) Field of Classification Search
USPC .......................................................... 348/143
See application file for complete search history.

(56) References Cited

U.S. PATENT DOCUMENTS

| 5,892,554 | A | 4/1999 | DiCicco et al. | |
| 7,796,155 | B1 * | 9/2010 | Neely et al. | 348/157 |
| 2003/0061344 | A1 * | 3/2003 | Monroe | 709/224 |
| 2008/0291279 | A1 * | 11/2008 | Samarasekera et al. | 348/159 |

* cited by examiner

*Primary Examiner* — Larry Donaghue
*Assistant Examiner* — Marshall McLeod
(74) *Attorney, Agent, or Firm* — Seager, Tufte, Wickhem LLC

(57) ABSTRACT

A system for providing combined real-time data and live video of an enclosure. The real-time data may be overlayed on live video. Additionally, or instead, alarms and/or real-time control capabilities may be overlayed on the live video. An embedded server may be connected to sensors and cameras at the enclosure for providing the video with the overlaid information to a network. A user interface may obtain access to the overlaid video via the network.

18 Claims, 5 Drawing Sheets

COMBINED REAL-TIME DATA AND LIVE VIDEO SYSTEM

BACKGROUND

The invention pertains to information and particularly display of information. More particularly, the invention pertains to display of data.

SUMMARY

The invention is a mechanism for displaying real-time data overlaid on a live video stream. The display of this information may be from an Internet-capable Web page served from an embedded server. The mechanism may be used for observing storage spaces, particularly those that require temperature control and close observation. The mechanism may have other uses.

DESCRIPTION

Figure 1:
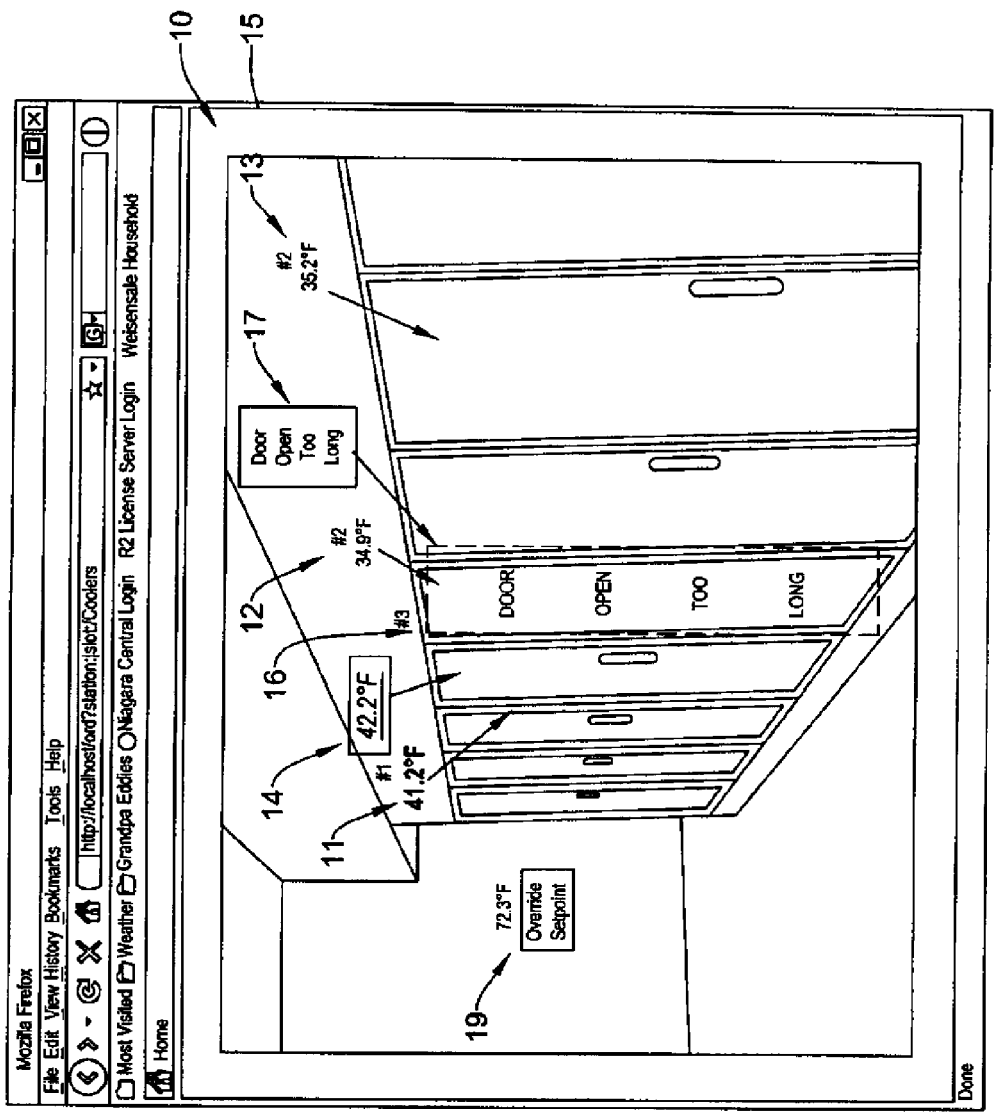
FIG. 1 is a diagram of an illustrative example of a system having a sample screen capture of live video with a data overlay from a camera viewing a storage container.
Figure 2:
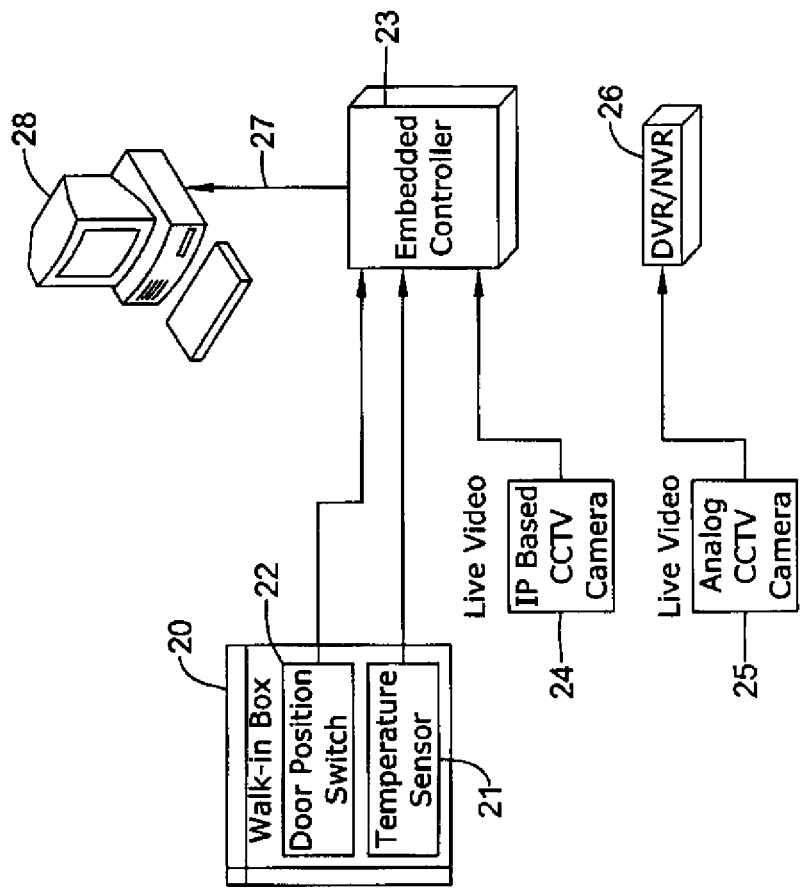
FIG. 2 is a diagram of the data sensing, video and processing components of the example system.

The present system may have a capability to overlay real-time data on top of a live video stream on an Internet capable Web page served from an embedded server or controller. FIG. 1 is an example of a screen capture from a Microsoft Windows™ based personal computer utilizing a Microsoft Internet Explorer™.

The present system may have an embedded server or controller, camera and desired sensors. An embedded controller may be a controller (or computer) that is embedded into some device for some a purpose other than to provide general purpose computing. For example, a reliable embedded Ethernet and wireless networking solution may offer a simple, cost-effective and reliable way to seamlessly embed network connectivity and Web server technology into a self-contained system. The system may provide a live video stream and real time data simultaneously on the same Web page. The live video stream may be defined as any form of video compression utilizing MJPEG, MPEG4, H.264, or other form of video encoding for the purpose of displaying the live video utilizing an Internet browser technology. The real-time data may be defined as information in a form of text or other types of visual information for the purpose of informing an observer as to the current condition or state of the physical entity currently being viewed as a part of the live video.

The system may include overlaying real-time control capabilities in addition to overlaying real-time data. It may also include either real-time data or real-time control versus real-time data and real-time control. These "real-time" features may be used in conjunction with the use of Internet WEB browser technology as the user interface to an embedded controller.

Some examples of the embedded controllers which fit this classification may include, but not limited to, the following items: 1) Set-top controllers used to connect televisions to a cable or fiber optic television programming provider. This embedded controller may overlay real-time TV programming information over the live video from an IO based camera; 2) TCP/IP network routers and switches. This embedded controller may overlay real-time TCP/IP configuration data over a live video stream displaying a camera view of a server room; 3) Building automation embedded controllers. This embedded controller may overlay real-time operational data such as temperature, pressure, or flow rate over a live video stream showing a mechanical equipment room in a building; 4) Security controllers used for access control and intrusion detection. This embedded controller may overlay the actual names of individuals walking through a door way over a live video stream showing the actual door way; 5) An embedded hospital monitoring controller used for in-room patient monitoring. This embedded controller may overlay real-time patient data such as heart rate or other medical information over a live video showing the actual patient in the room; 6) Convenient store monitoring controllers utilized to monitor fuel and other supplies and equipment local to the store. The convenience store example above applies to this type of embedded controller; 7) Residential controllers utilized to monitor and control lights, audio/visual, heating, ventilation, and air conditioning equipment. This embedded controller may overlay real-time information related to occupancy, temperature or security status over a live video stream showing the interior of a residence; and 8) An energy management controller utilized to monitor and control various devices in a residence or commercial facility for the purpose of energy management. This embedded controller may overlay real-time energy usage data such as kilowatts or kilowatt hours over a live video stream of the actual equipment utilizing the electrical power.

FIG. 1 is a diagram of a sample screen capture of a web page 15 using Microsoft Internet Explorer™. The sample screen capture shows live video from a camera located in a convenience store viewing a refrigerated products or perishable items storage container 10 having sections 11, 12 and 13, representing the first, second and third portions, respectively, of the container. On the example, the container 10 is a refrigerated walk-in box. However, the real-time data could be any piece of information being displayed in conjunction with any item in the live video stream. Section 11 shows a real-time data label displaying an alarm condition showing that the current temperature of this section of the refrigerated products storage is above the safe temperature limit. For instance, the temperature label "41.2° F." reveals an alarm condition. This indication may be emphasized with a label 14 being in a color such as red, having an enlarged font size, a blinking font, italics, a box, or other attention-getting format. Section 12 shows the second portion of the storage having a label "34.9° F." indicating the temperature in the section portion is within the safe range. There also appears a frame 16 proximate to the door of section 12. Within frame 16 is a message "DOOR OPEN TOO LONG". This message is illustrated by box 17. This and other like messages proximate to any one of the section may appear if there is an issue or problem relative to the respective section. Such messages may indicate an alarm condition be real-time data. Section 13 shows a second portion of the storage having a certain temperature with a label "35.2° F.". Area 19 indicates an override setpoint. In this case, the setpoint is at "72.3° F.".

If the temperature for any one of the portions of the storage is deemed to be too cold, the temperature label may be in another color such as blue, have an enlarged font size, a blinking font, or other attention-getting format. Normal or appropriate temperatures (i.e., within the safe temperature limit) for the sections may be indicated with labels being in white or black, depending on the image background of where the label is situated. The temperature labels may display real-time data.

Software technology may allow an embedded server to support the combined real-time data and live video from it. Software tools may be used to design the web page supporting the live video stream with the real-time-data. Using these newly created tools to configure and demonstrate the technology in an embedded server.

Real-time data may be taken from a walk-in box 20 which may have equivalents such as storage container 10 or one of its sections 11, 12 or 13. A temperature sensor 21 may provide real-time data such as temperature inside of the walk-in box 20. Further, there may be a door-position switch 22 which can also provide real-time information relative to whether the door to the walk-in box 20 is open or not. Door-position switch 22 may also indicate partial opening of the door. To indicate partial opening of a door, the switch may be sensor, a number of switches, one for each increment of the door opening, a potentiometer, or other mechanism for indicating various positions of a door position. Other sensors, switches, detectors or indicators may be placed in or proximate to the walk-in box 20 to obtain real-time data about the box. The data may be sent to a processor 23, which may be an embedded controller, or another kind of processing mechanism capable of handling the real-time data from sensor 21, switch 22, and/or other sensors, switches, detectors or indicators proximate to or inside box 20. Other sensors may include the following examples, but not limited to them, temperature sensors, door position sensors, smoke sensors, intrusion sensors, moisture sensors; water pressure sensors, light sensors, power usage sensors, air pollution sensors, and so on.

Live video may be taken of walk-in box 20 with an IP (Internet protocol) based CCTV (closed-circuit television) camera 24, 25. Live video from the IP based CCTV camera 24 may go to controller 23. Live video may instead or also go from the analog-based CCTV camera 25 to controller 23 via a digital video recorder (DVR) 26 or a network video recorder (NVR) 26. Recorder 26, besides recording images from camera 25, may provide analog-to-IP (digital) signal conversion. An IP or digital based signal may proceed from recorder 26 to controller 23.

Controller 23 may combine the images of the walk-in box 20 with the real time data of conditions of the box. The controller may, for example, overlay the real-time data (e.g., temperature, door position, and so on) on top of the images or on a live video stream from a camera 24, 25. The resultant video 27 with the data may be provided to a computer 28. Computer 28 may include installed internet browser software. Computer 28 may be utilized to view video 27 from an internet web site served by the embedded controller 23. This web site or page may be accessed by a computer at a remote location having access to the internet, to observe the walk-in box 20 and superimposed data about the box. Walk-in box 20 may instead be a residential or commercial building, facility, estate, base, campus, and so on. Sensors 21 and 22 may be sensors and indicators of items or parameters besides temperature and door position.

Figure 3A:
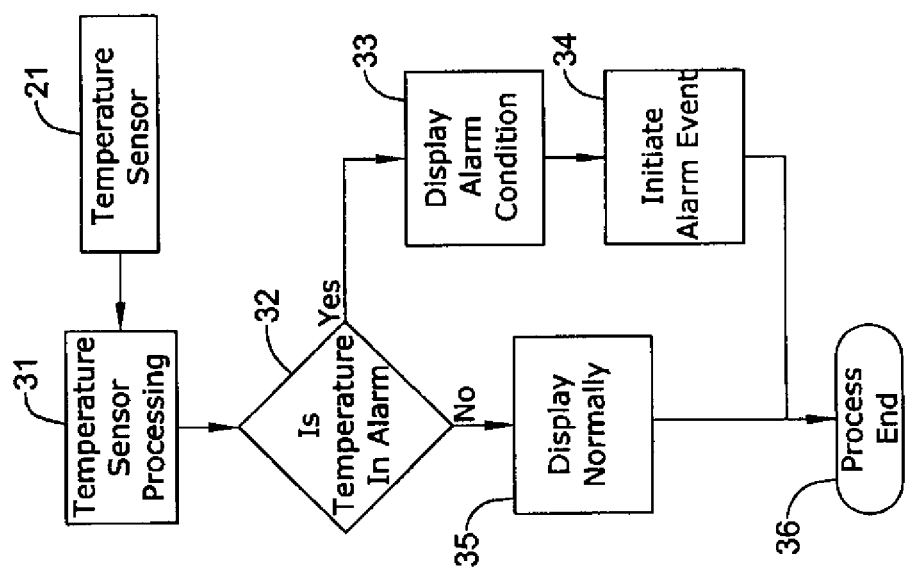
FIGS. 3a and 3b are flow diagrams of sensing operations relative to a storage container.
Figure 3B:
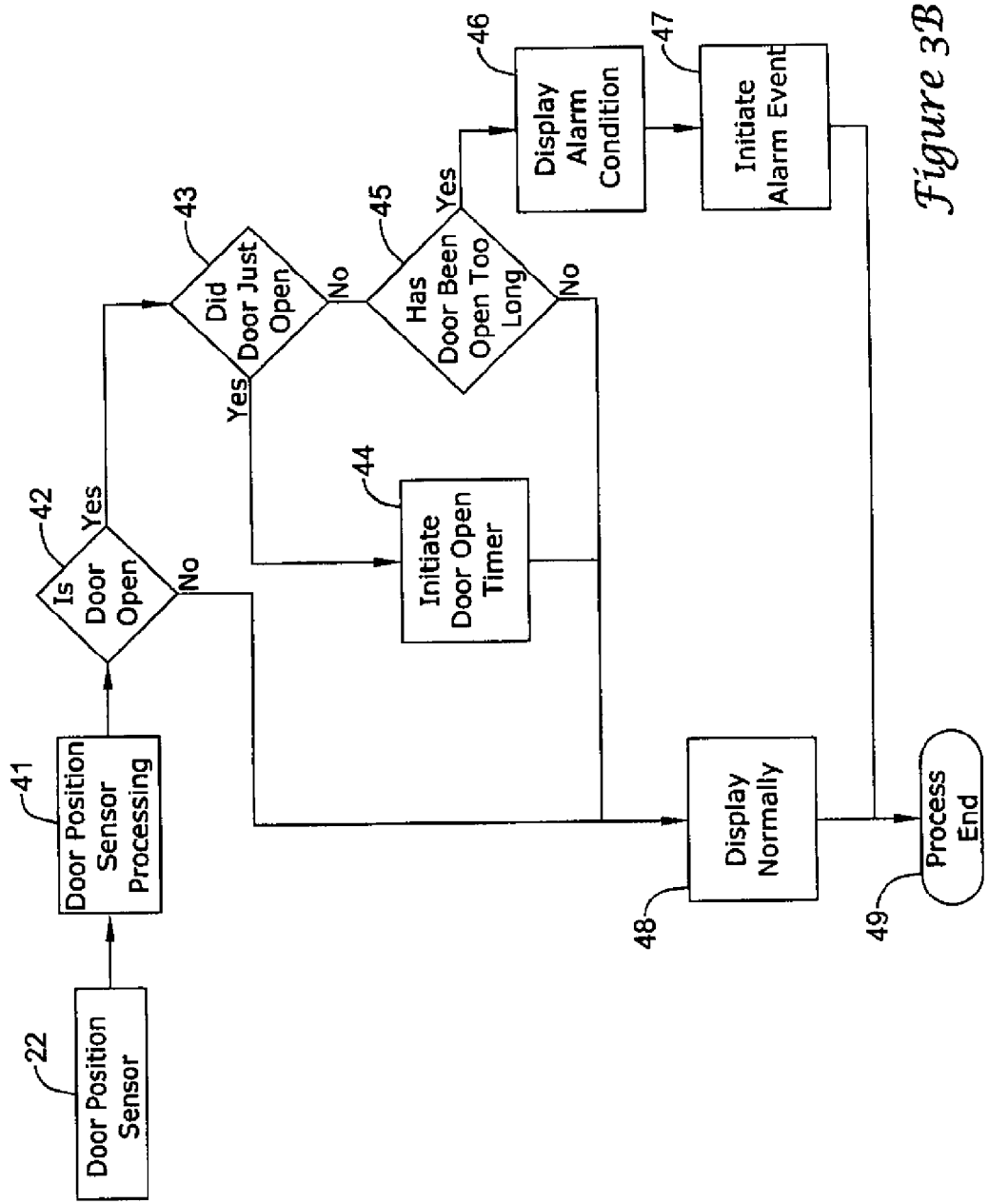

FIGS. 3a and 3b are flow diagrams of operations of the present system. Temperature and door position sensing are illustrated. However, other sensors or indicators may be associated with walk-in box 20. In FIG. 3a, a signal from sensor 21 indicating temperature at box 20 may go to temperature sensor processing at block 31. The signal may be analog or digital. At symbol 32 is a question of whether temperature indication is within an alarm range. If the answer is yes, then an alarm condition may be displayed at block 33 and an alarm event may be initiated at block 34. This process may end at symbol 36. If the temperature indication is not within the alarm range, then the temperature may be displayed normally at block 35. This process may end at symbol 36.

In FIG. 3b, a signal from sensor 22 indicating door position at box 20 may go to door position sensor processing at block 41. At symbol 42 is a question of whether the door position is indicated as open or not. If the question is no, the door information may be displayed normally at block 48. The process after block 48 may end at symbol 49. If the answer is yes at symbol 42, then a question of whether the door was just opened or not is asked at symbol 43. If the answer is yes at symbol 43, then a door-open timer may be initiated at block 44 and the door information may be displayed normally at block 48. The process after block 48 may end at symbol 49. If the answer is no, then a question of whether the door has been open too long is asked at symbol 45. If the answer is yes, then a display alarm condition may be indicated at block 46 and initiate an alarm event may occur at block 47. This process may end at symbol 49. If the answer to the question at symbol 45 is no, the door information may be displayed normally at block 48. This process may end at symbol 49.

Figure 4:
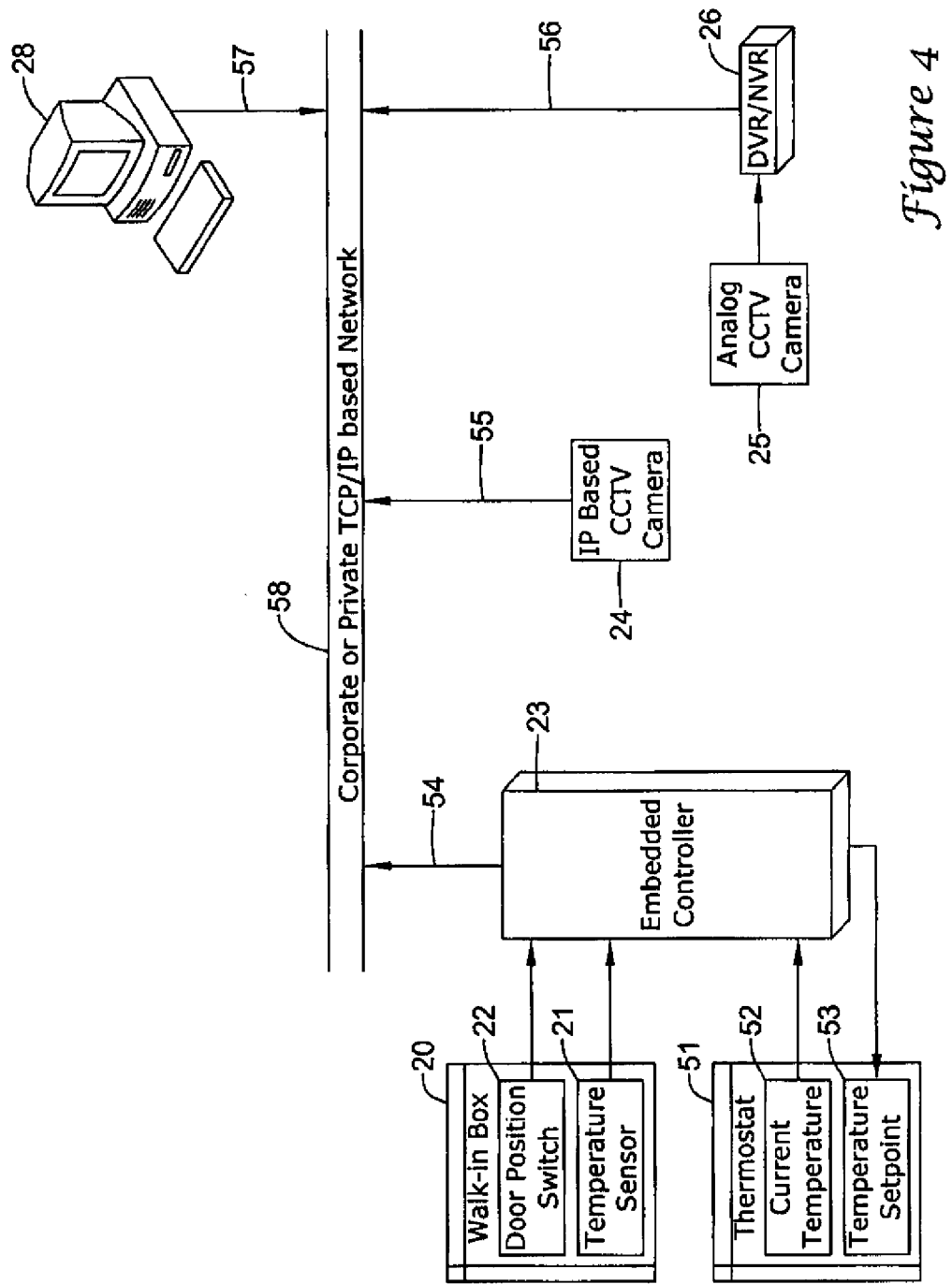
FIG. 4 is a diagram of the example system and its connections to the network.

FIG. 4 is a diagram of the system and its connections to the network. There may be real-time data from the temperature sensor 21 and door position switch 22 of the walk-in box 20 which go to embedded controller 23. Additionally, there may be real-time data from a thermostat 51. Current temperature 52 may be provided from thermostat 51 to embedded controller 23. Controller 23 may provide a temperature setpoint 53 adjustment to thermostat 51. There may be the IP-based camera CCTV camera 24 for obtaining video of the walk-in box 20. Also, or instead of, there may be the CCTV analog camera 25 for obtaining video of the walk-in box 20. Camera 25 may have an output connected to a digital video recorder (DVR) 26 or a network video recorder (NVR) 26. Embedded controller 23, IP-based camera 24 and the DVR/NVR 26 may have connections 54, 55 and 56, respectively, to a corporate or private transmission control protocol/internet protocol (TCP/IP) based network 58. Computer 28 may have internet browser software installed and utilized so as to view the Web site served by embedded controller 23.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. An enclosure space data and video observation system for perishable goods storage, comprising:

one or more sensors situated in a refrigerated, perishable goods enclosure space, the one or more sensors configured to detect at least one parameter indicative of an environmental condition within the refrigerated, perishable goods enclosure space;

a video camera having a field of view which encompasses the refrigerated, perishable goods enclosure space;

a controller connected to the one or more sensors, the video camera, and a network; and a user interface connected to the controller; and wherein:
the controller receives a live video image from the video camera showing the refrigerated, perishable goods enclosure space;
the controller provides the live video image having a real-time overlay on the video image;
the user interface is for providing the live video image having the real-time overlay on the video image on a display; and
the real-time overlay provides environmental data from the one or more sensors, wherein if the controller determines that the environmental data from the one or more sensors does meet a predetermined criterion, at least a portion of the real-time overlay is visually altered to indicate an alarm condition.

2. The system of claim 1, wherein:
the refrigerated, perishable goods enclosure space comprises sub-enclosures;
one or more sensors are situated in one or more sub-enclosures; and
the one or more sensors comprise a temperature sensor and a door position sensor for the one or more sub-enclosures; and
each temperature sensor is a component of a thermostat connected to the controller.

3. The system of claim 1, wherein the real-time overlay provides real-time control capabilities.

4. The system of claim 1, wherein:
the network uses Internet Web browser technology as a user interface to the controller; and
the controller is an embedded controller.

5. The system of claim 1, wherein:
the network is a TCP/IP based network; and
the network may comprise TCP/IP routers and switches.

6. The system of claim 1, wherein the controller is a set-top controller for connecting televisions to a cable or fiber optic television programming provider.

7. A facility data and video observation system, comprising:
one or more sensors situated in a perishable goods storage facility, the one or more sensors configured to detect at least one parameter indicative of an environmental condition within the perishable goods storage facility;
one or more video cameras having a fields of view which encompass the perishable goods storage facility; and
a controller connected to the one or more sensors, the one or more video cameras, and a network; and
wherein:
the controller receives a live video images from the one or more video cameras of the perishable goods storage facility; and
the controller provides the live video images having real-time overlays on the video images, wherein the real-time overlays provide environmental data from the one or more sensors and wherein at least a portion of the real-time overlay is visually altered to indicate an alarm condition if the environmental data from the one or more sensors falls outside of a predetermined range.

8. The system of claim 7, further comprising:
a user interface connected to the controller; and
wherein the user interface is for providing the live video images, having the real-time overlays on the video images, on a display.

9. The system of claim 7, wherein the real-time overlays provide real-time control capabilities.

10. The system of claim 7, wherein the controller is a building automation embedded controller for the perishable goods storage facility.

11. The system of claim 7, wherein the controller is a security controller for access control and intrusion detection of the perishable goods storage facility.

12. The system of claim 7, wherein the controller is a store monitoring controller for monitoring fuel and other supplies and equipment of the perishable goods storage facility.

13. The system of claim 7, wherein the controller is a residential controller for monitoring and controlling lights, heating, ventilation and air conditioning equipment of the perishable goods storage facility.

14. The system of claim 7, wherein the controller is an energy management controller for monitoring and controlling devices in the perishable goods storage facility for energy management.

15. A method for monitoring an enclosure comprising:
sensing one or more parameter information in a refrigerated, perishable goods enclosure, the one or more parameter information indicative of an environmental condition within the a refrigerated, perishable goods enclosure;
capturing live video images of the a refrigerated, perishable goods enclosure;
overlaying and displaying real-time sensed parameter information including information indicative of an environmental condition on the live video images;
visually altering at least a portion of the displayed real-time sensed parameter information to indicate an alarm condition if the sensed parameter information does not meet a predetermined criteria for the sensed parameter; and
providing the live video images with the overlayed information to a network for access by a user interface.

16. The method of claim 15, further comprising overlaying real-time control capabilities on the live video images.

17. The system of claim 7, wherein at least one of the one or more sensors is a temperature sensor.

18. The system of claim 1, wherein at least one of the one or more sensors is a temperature sensor or a door position sensor.

* * * * *